(12) United States Patent
Xu et al.

(10) Patent No.: US 10,594,705 B2
(45) Date of Patent: Mar. 17, 2020

(54) SYSTEMS AND METHODS FOR INSTRUCTIONS-BASED DETECTION OF SOPHISTICATED OBFUSCATION AND PACKING

(71) Applicants: Shouhuai Xu, Helotes, TX (US); Moustafa Elsayed Saleh, San Antonio, TX (US); Edward Paul Ratazzi, Rome, NY (US)

(72) Inventors: Shouhuai Xu, Helotes, TX (US); Moustafa Elsayed Saleh, San Antonio, TX (US); Edward Paul Ratazzi, Rome, NY (US)

( * ) Notice: Subject to any disclaimer, the term of this patent is extended or adjusted under 35 U.S.C. 154(b) by 0 days.

(21) Appl. No.: 15/287,705

(22) Filed: Oct. 6, 2016

(65) Prior Publication Data
US 2017/0099307 A1    Apr. 6, 2017

Related U.S. Application Data

(60) Provisional application No. 62/238,082, filed on Oct. 6, 2015.

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
CPC .................................................. H04L 63/1416
See application file for complete search history.

(56) References Cited

U.S. PATENT DOCUMENTS

| | | | | |
|---|---|---|---|---|
| 6,668,325 B1 * | 12/2003 | Collberg | ................ | G06F 21/14 713/194 |
| 7,165,076 B2 * | 1/2007 | Bentley | .................... | G06F 21/16 |
| 7,584,364 B2 * | 9/2009 | Jakubowski | ............ | G06F 21/14 713/189 |
| 7,814,544 B1 * | 10/2010 | Wilhelm | ............... | G06F 21/566 719/328 |
| 8,789,174 B1 * | 7/2014 | Gupta | .................... | G06F 21/552 709/223 |
| 9,135,442 B1 * | 9/2015 | Kennedy | ............... | G06F 21/563 |

(Continued)

OTHER PUBLICATIONS

Saleh, Moustafa, E. Paul Ratazzi, and Shouhuai Xu. "Instructions-based detection of sophisticated obfuscation and packing." Military Communications Conference (MILCOM), 2014 IEEE. IEEE, 2014. (Year: 2014).*

(Continued)

*Primary Examiner* — Shawnchoy Rahman
(74) *Attorney, Agent, or Firm* — Roman Aguilera, III

(57) ABSTRACT

Disclosed herein are new methods and systems for detecting obfuscated programs. We build a recursive traversal disassembler that extracts the control flow graph of binary files. This allows us to detect the presence of interleaving instructions, which is typically an indication of the opaque predicate anti-disassembly trick. Our detection system uses some novel features based on referenced instructions and the extracted control flow graph that clearly distinguishes between obfuscated and normal files. When these are combined with a few features based on file structure, we achieve a very high detection rate of obfuscated files.

7 Claims, 7 Drawing Sheets

(56) References Cited

U.S. PATENT DOCUMENTS

2013/0326625 A1* 12/2013 Anderson ............... G06F 21/56
726/23

OTHER PUBLICATIONS

Saleh, Moustafa, E. Paul Ratazzi, and Shouhuai Xu. "Instructions-based detection of sophisticated obfuscation and packing." 2014 IEEE Military Communications Conference. IEEE, 2014. (Year: 2014).*

Treadwell, Scott, and Mian Zhou. "A heuristic approach for detection of obfuscated malware." 2009 IEEE International Conference on Intelligence and Security Informatics. IEEE, 2009. (Year: 2009).*

* cited by examiner

```
33C0              XOR EAX,EAX
90                NOP
90                NOP
50                PUSH EAX
3BC0              CMP EAX,EAX
75 08             JNE SHORT 00401035
81C1 33030000     ADD ECX,333
EB 01             JMP SHORT 00401036
0F9090 8BC9B      SETO BYTE PTR DS:[EAX+44BAC98B]
04 00             ADD AL,0
0068 98           ADD BYTE PTR DS:[EAX-78],CH
3040 00           XOR BYTE PTR DS:[EAX],AL
50                PUSH EAX
E8 32000000       CALL <JMP.&kernel32.GetProcAddress>
```

FIGURE 2

SYSTEMS AND METHODS FOR INSTRUCTIONS-BASED DETECTION OF SOPHISTICATED OBFUSCATION AND PACKING

CROSS-REFERENCE TO RELATED APPLICATIONS

This application claims the benefit under Title 35 United States Code § 119(e) of U.S. Provisional Patent Application Ser. No. 62/238,082; Filed: Oct. 6, 2015, the full disclosure of which is incorporated herein by reference.

STATEMENT REGARDING FEDERALLY SPONSORED RESEARCH OR DEVELOPMENT

This invention was made with government support under grant no. 1111925 awarded by the National Science Foundation (NSF) and under grant no. W911NF-12-1-0286 awarded by the Army Research Office (ARO). The Government has certain rights in the invention.

THE NAMES OF THE PARTIES TO A JOINT RESEARCH AGREEMENT

Not applicable

INCORPORATING-BY-REFERENCE OF MATERIAL SUBMITTED ON A COMPACT DISC

Not applicable

SEQUENCE LISTING

Not applicable

FIELD OF THE INVENTION

The present invention generally relates to systems and methods for the detection obfuscation and packing in computer files and systems.

BACKGROUND OF THE INVENTION

Without limiting the scope of the disclosed device, the background is described in connection with novel systems and methods of use for the detection obfuscation and packing in computer files and systems.

Zero-day malware detection is a persistent problem. Hundreds of thousands of new malware are produced and published on the Internet daily. Although conventional signature-based techniques are still widely relied upon, they are only useful for known malware. Many research efforts have aimed at helping flag and detect unknown suspicious and malicious files. All of these techniques can be categorized into sandbox analysis, heuristic static analysis or code emulation. Among the three, heuristic static analysis is the fastest, yet the weakest against obfuscation techniques. Code obfuscation includes packing, protecting, encrypting or inserting anti-disassembly tricks, and is used to hinder the process of reverse engineering and code analysis. About 80% to 90% of malware use some kind of packing techniques [1] and around 50% of new malware are simply packed versions of older known malware according to a 2006 article [2], and it is believed to be more than that by now. While it is very common for malware to use code obfuscation, benign executable files rarely employ such techniques. Thus, it has become a common practice to flag an obfuscated file as suspicious and then examine it with more costly analysis to determine if it is malicious or not.

Most current work of detecting obfuscated files is based on executable file structure characteristics. Many public packers, indeed, exhibit identifiable changes in the packed PE file. However, this is not always the case with custom packers and self-encrypting malware. Moreover, packing is not the only obfuscation technique used by malware writers. Malware can use anti-analysis tricks that hinder the disassembly or analysis process. Such tricks can leave absolutely no trace in the header as it is based on obfuscating the instructions sequence and the execution flow of the program. Other methods depend on detecting the signature of known packers in the file. The drawback of this method is obvious as it does not work with unknown and custom packers and cryptors. It also fails if the signature is slightly modified. Calculating the entropy score of the file is another method of identifying packed and encrypted files. This method could be effective against encryption or packing obfuscation, but is ineffective against anti-disassembly tricks. In addition, the entropy score of a file can be reduced to achieve low entropy similar to those normal program.

While all of the aforementioned systems and methods may fulfill their unique purposes, none of them fulfill the need for a practical, effective, and efficient means for the detection obfuscation and packing in computer files and systems.

Therefore, the present invention proposes a novel system and method of use for the detection obfuscation and packing in computer files and systems that addresses the shortcomings in the prior art.

BRIEF SUMMARY OF THE INVENTION

The present invention, therefore, provides for the detection obfuscation and packing in computer files and systems.

Disclosed herein are new methods and systems for detecting obfuscated programs. Utilized is a recursive traversal disassembler that extracts the control flow graph of binary files. This allows the detection of the presence of interleaving instructions, which is typically an indication of the opaque predicate anti-disassembly trick. The detection system uses some novel features based on referenced instructions and the extracted control flow graph that clearly distinguishes between obfuscated and normal files. When these are combined with a few features based on file structure, achieved is a very high detection rate of obfuscated files.

More specifically, various embodiments of the invention leverage the fact that some advanced obfuscated malware use opaque predicate techniques to hinder the process of disassembly, and utilized is a technique that turns this strength into a weakness by detecting its presence and flagging the file as suspicious. The system and methods identify distinguishing features between obfuscated and non-obfuscated files by studying their control flow graphs. These features help detect obfuscated files while avoiding drawbacks of the other methods that rely on file structure. A fast scanning speed of 12 ms per file on average is achieved, despite the fact that the method encompasses disassembly, control flow graph creation, feature ex-traction, and file structure examination.

In summary, the present invention discloses a novel system and method of use for the detection obfuscation and packing in computer files and systems.

BRIEF DESCRIPTION OF THE SEVERAL VIEWS OF THE DRAWINGS

For a more complete understanding of the features and advantages of the present invention, reference is now made to the detailed description of the invention along with the accompanying figures in which:

FIG. 2 is a portion of OllyDbg disassembly for the example in listing 1 in accordance with embodiments of the disclosure;

DETAILED DESCRIPTION OF THE INVENTION

Figure 1:
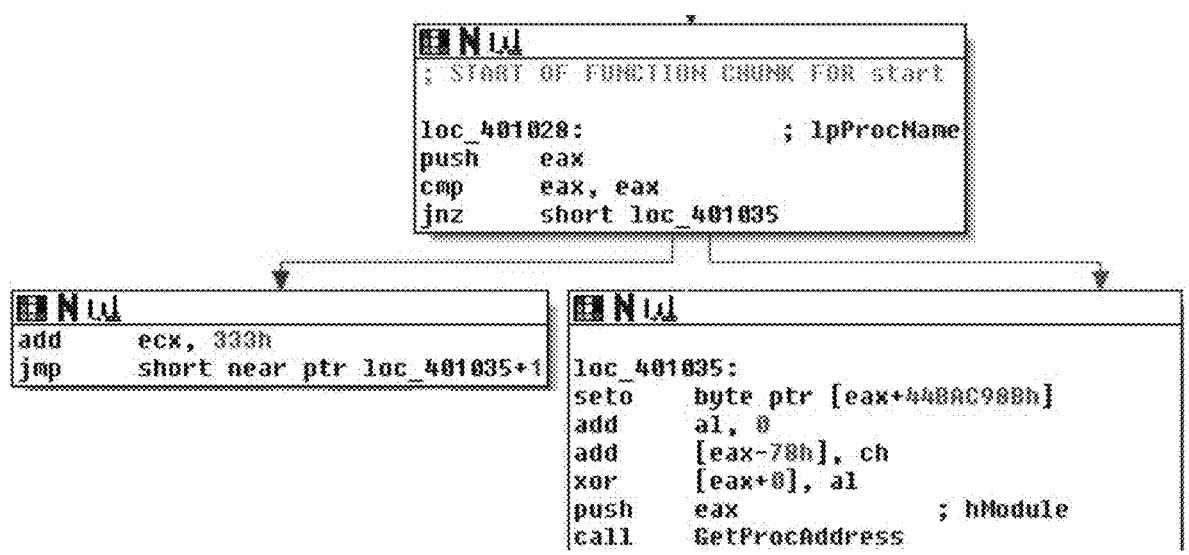
FIG. 1 is a portion of IDA Pro graph for the example in listing 1 in accordance with embodiments of the disclosure.

Disclosed herein is an improved system and method of use directed to the detection obfuscation and packing in computer files and systems. The numerous innovative teachings of the present invention will be described with particular reference to several embodiments (by way of example, and not of limitation).

Various techniques have been used for the detection of obfuscated or packed files. These techniques include:

Entropy-based detection. Lyda and Hamrock presented the idea of using entropy to find encrypted and packed files [1]. The method became widely used as it is efficient and easy to implement. However, some non-packed files could have high entropy values and thus lead to false-positives. For example, the ahui.exe and dfrgntfs.exe files have an entropy of 6.51 and 6.59 respectively for their text section [3], [4]. (These two example files exist in Windows XP 32-bit and are detected by our system as non-packed.) In addition to entropy-based evasion techniques mentioned in [5], simple byte-level XOR encryption can bypass the entropy detection as well.

Signature-based detection. A popular tool to find packed files is PEiD, which uses around 470 packer and crypter signatures [6]. A drawback of this tool is that it can identify only known packers, while sophisticated malware use custom packing or crypting routines. Moreover, even if a known packer is used, the malware writer can change a single byte of the packer signature to avoid being detected as packed. In addition, the tool is known for its high error rate [7].

File header anomaly detection. Other research such as [7]-[10] use the PE header and structure information to detect packed files. These techniques can get good results only when the packer changes the PE header in a noticeable way.

Besides the shortcomings of every technique, notably, none of the aforementioned techniques can statically detect the presence of anti-disassembly tricks or other forms of control flow obfuscation, yet these are now commonly used by a wide range of advanced malware. In addition, the disclosed and claimed system does not depend on a coarse-grained entropy score of the file or section, signature of packers, or file header features. Thus, it is able to overcome these shortcomings.

Anti-Disassembly Tricks Used by Malware Writers

Malware writers use a variety of anti-analysis tricks to protect against all kinds of analyses. One class of these is anti-disassembly tricks. Anti-disassembly tricks hinder the process of disassembly and hence reduce the effectiveness of static analysis-based detection of malware. One of the most common techniques is to use an Opaque Predicate. Although there are legitimate reasons for including opaque predicate tricks, such as watermarking [11] and to hinder reverse engineering, they are commonly used in malware to prevent analysis.

Opaque predicate tricks [12] insert conditional statements (usually control flow instructions) whose outcome is constant and known to the malware author, but not clear in static analysis. Thus, a disassembler will follow both directions of the control flow instruction, one of which leads to the wrong disassembly and affects the resulting control flow graph. As an example, listing 1 shows an opaque predicate trick inserted on lines 6 and 7 of the code snippet. Since the compare on line 6 will always evaluate to true, the fake branch will never be taken at runtime. However, to a disassembler, this fact is not apparent and it will evaluate both paths.

In this example, the disassembler will follow the target of the jne instruction on line 7, which leads to a byte of data on line 11. The disassembly will continue starting with this byte, 0F, resulting in decoding an instruction with opcode 0F9090 8BC9BA44. This incorrect instruction is SETO BYTE PTR DS:[EAX+44BAC98B] as shown in FIGS. 1 and 2 for two common disassemblers, IDA Pro and OllyDbg, respectively.

Figure 3:
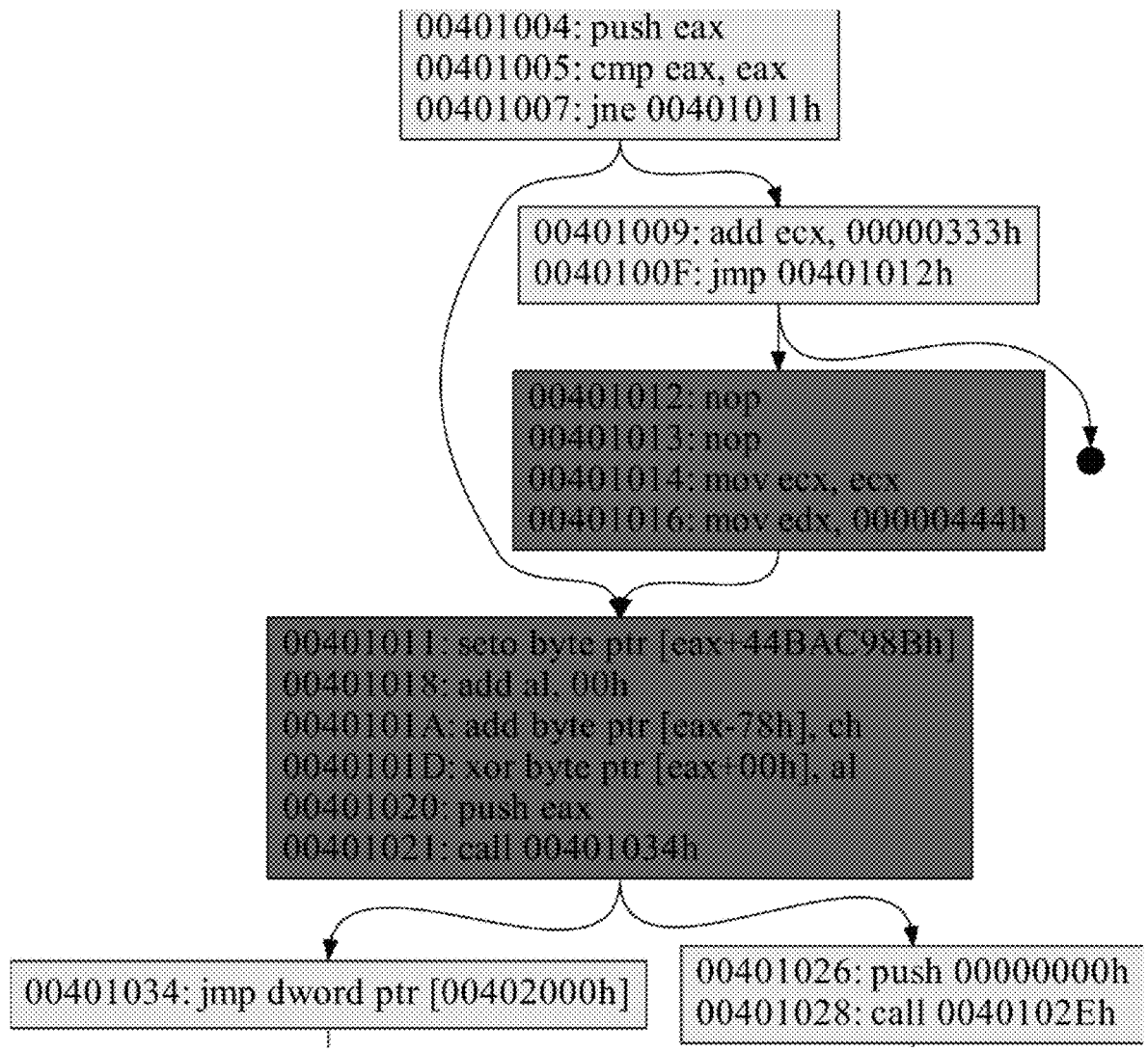
FIG. 3 is a part of a disassembler's output for the example in listing 1 in accordance with embodiments of the disclosure.

The system utilizes a novel recursive traversal disassembler that is able to detect interleaving code and flag the corresponding basic block as problematic, so an analyst could easily know where to find these tricks. FIG. 3 shows a portion of the control flow graph output from the disassembler for this example. Two blocks are shown in red to indicate that they are interleaving and only one of them is correct.

| Listing 1. Opaque predicate trick snippet. | |
| --- | --- |
| 1 | xor eax, eax |
| 2 | nop |
| 3 | nop |
| 4 L1: | |
| 5 | push eax |
| 6 | cmp eax, eax |
| 7 | jne fake |
| 8 | add ecx, 333h |
| 9 | jmp skip |
| 10 fake: | |
| 11 | DB 0Fh |
| 12 skip: | |
| 13 | nop |
| 14 | nop |

Listing 1. Opaque predicate trick snippet.

```
15    mov ecx, ecx
16    mov edx, 444h
17    push offset ProcName
18    push eax
19    call GetProcAddress
```

Instructions-Based Detection: Turning Attackers' Strength into Weakness.

Due to obfuscation techniques such as opaque predicate, the control flow graph (CFG) and the sequence of instructions extracted from obfuscated programs are usually convoluted, resulting in different sizes of basic blocks compared to a normal program, a greater percentage of sink vertices of all basic blocks, and other telltale features. Introduce now are interesting features that can effectively identify an abnormal control flow graph and sequence of instructions. Shown now are how each of these features differs in case of obfuscated and clean files. The illustrative statistical distributions presented in this section are from representative file sets that are also used in the experiments of Section V.

Figure 4:
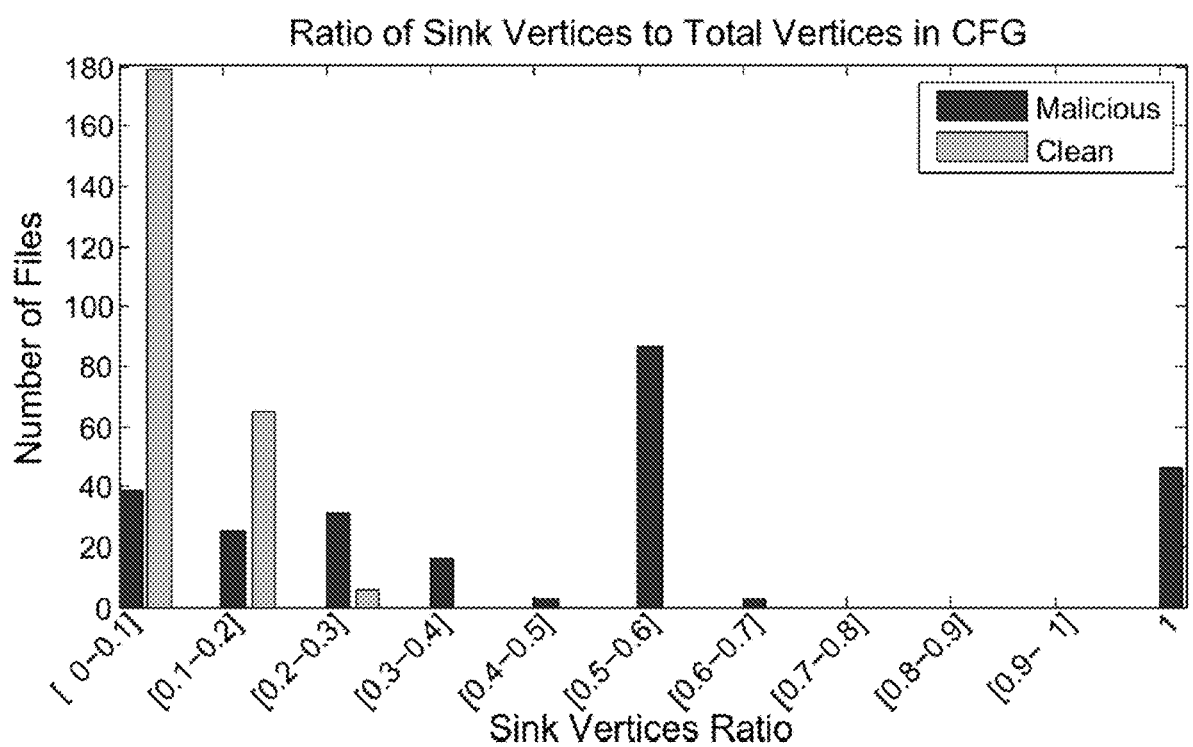
FIG. 4 is a distribution of sink vertices to all vertices ratio for malicious and clean file sets in accordance with embodiments of the disclosure.

Percentage of sink vertices in CFG. The CFG of a given program is a digraph where each vertex represents a basic block. Sink vertices in this context refer to those vertices with zero out-degree. Sink vertices are usually the exit point of the program, and since a typical program has few exit points in the code, the number of sink vertices is very small compared to other vertices. Obfuscated malware that employ anti-analysis techniques lead to inaccurate static disassembly of the file. Thus, the ratio of sink vertices to the total vertices becomes different from a normal file. FIG. 4 compares the ratio of sink vertices in both clean nonobfuscated and malicious obfuscated files, respectively.

Figure 5:
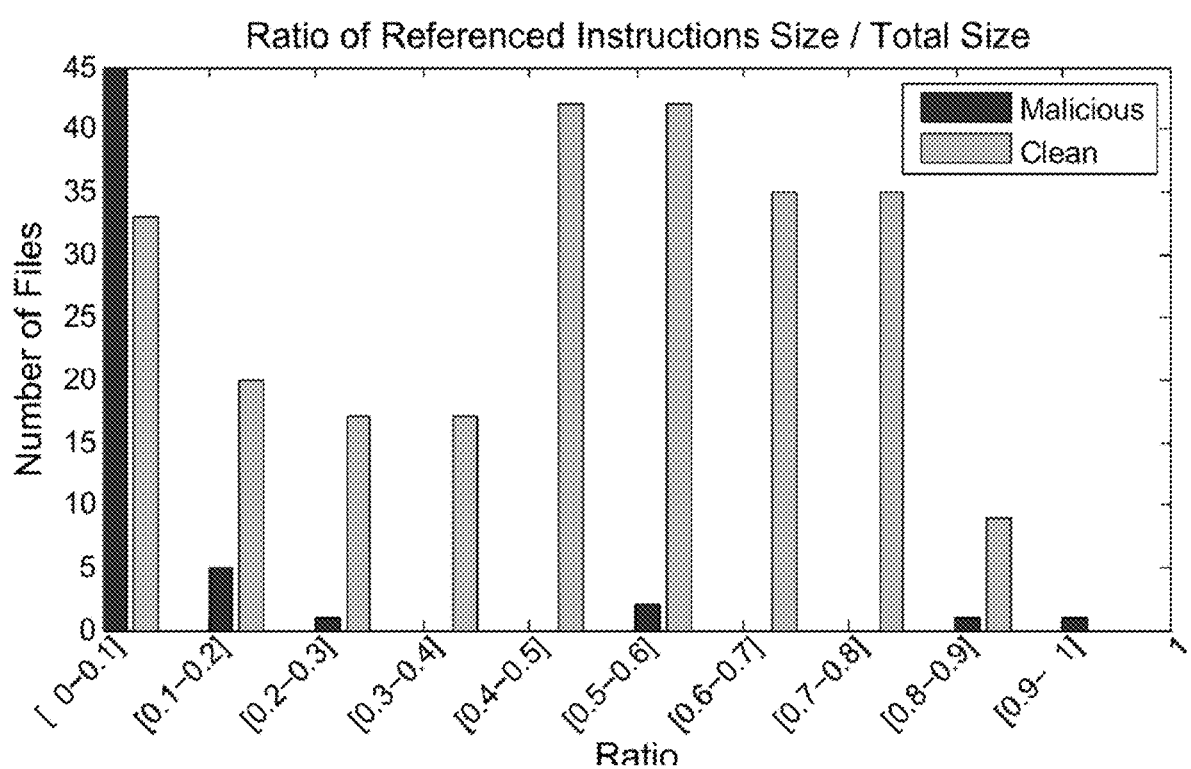
FIG. 5 is a distribution of referenced instruction size to section size ratio for malicious and clean file sets in accordance with embodiments of the disclosure.

Percentage of the size of referenced instructions to the entire size of the section. Due to code obfuscation, encryption or packing, the size of referenced instructions compared the size of the section is relatively smaller than that of clean files. The decryption or unpacking routine that exists in the same section of the encrypted or packed code occupies a much smaller size than the actual payload of the file. This fact represents a distinguishable feature between packed and non-packed files. FIG. 5 shows these values in different files in clean and malicious dataset.

Figure 6:
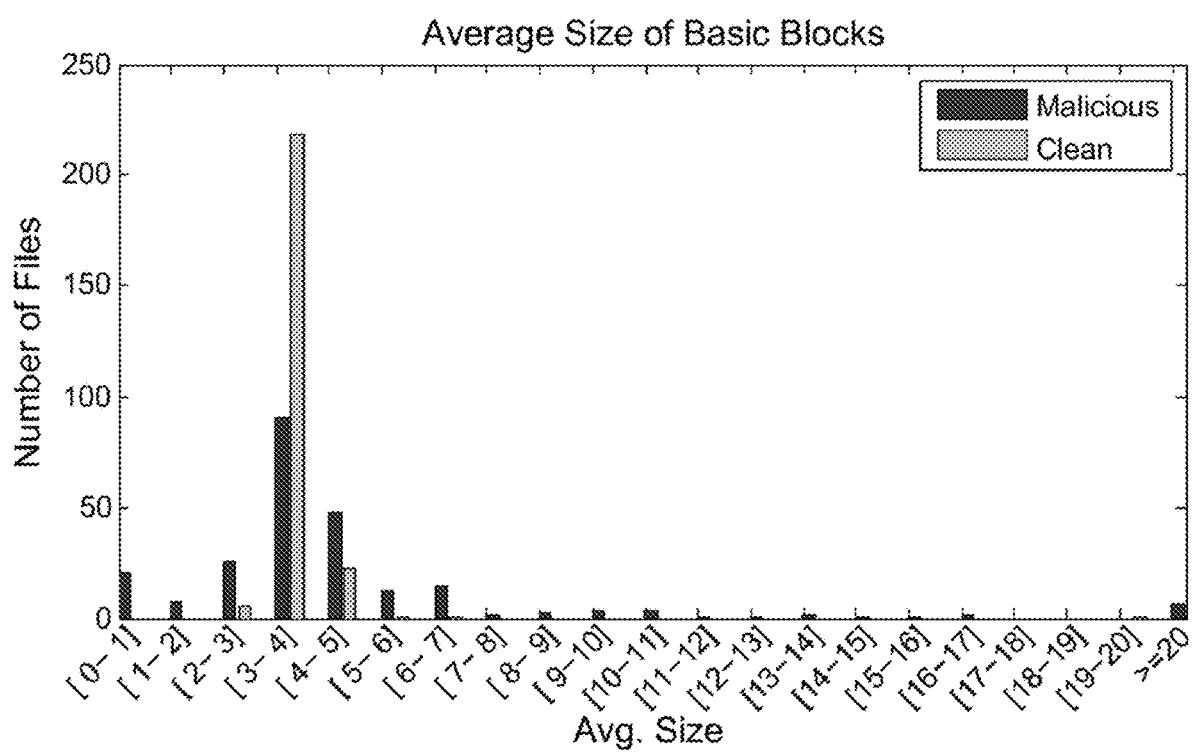
FIG. 6 is a distribution of basic block average size for malicious and clean file sets in accordance with embodiments of the disclosure.

Average number of instructions in basic blocks. After constructing the control flow graph of the program, each basic block will represent a set of instructions with a single entry and a single exit instruction. The exit instruction, in most cases, is a control transfer that affects the flow of the execution. If the disassembly was wrongly redirected into disassembling packed or encrypted data due to antidisassembly tricks, false instructions will be decoded, which will result in different characteristics of a typical control flow graph of a normal application. One of these characteristics is the average size of instructions in basic block. FIG. 6 shows the average number of instructions in a basic block in malicious and benign dataset respectively.

Figure 7:
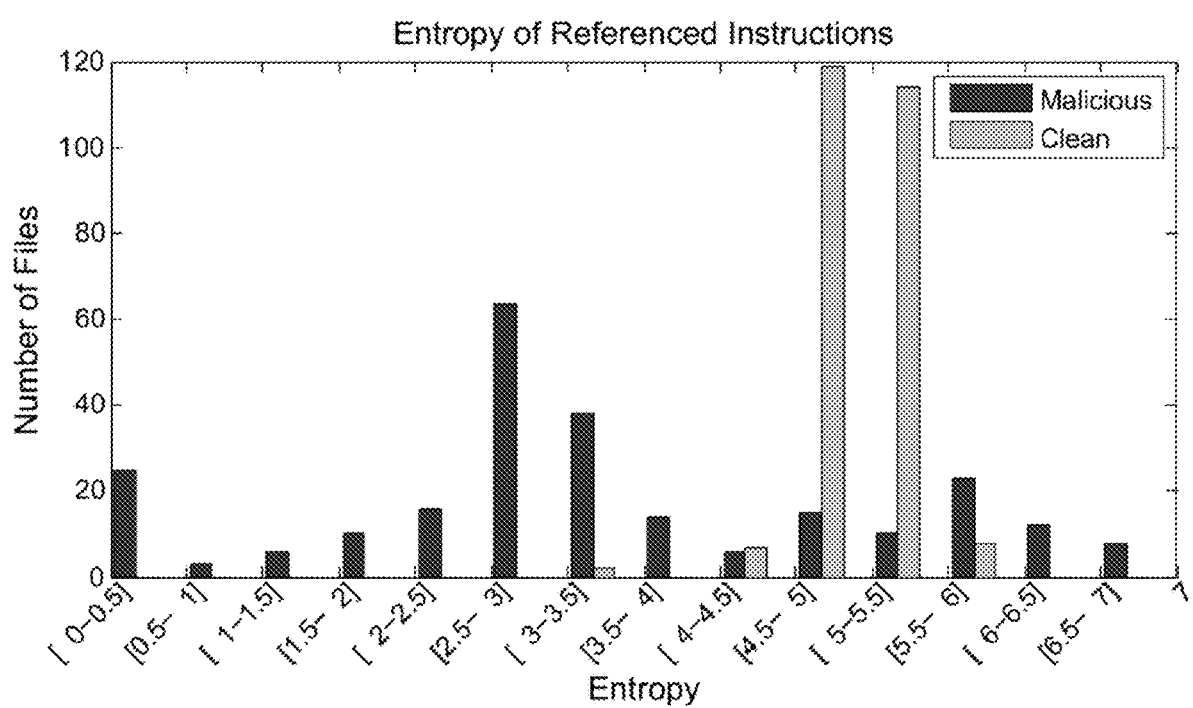
FIG. 7 is a distribution of file entropy for referenced instructions only in accordance with embodiments of the disclosure.

As discussed previously, entropy is a measure of randomness which can sometimes be used to detect packed files. Almost all techniques that use entropy to detect packed files calculate the entropy of the entire file, a section, or the file header. However, as explained earlier, an encrypted or packed data can still exhibit low entropy if an entropy reduction method is used. In addition, a normal program could contain data of high entropy within the code. In this case, the entropy of this data will be incorporated in the total entropy. This is a major source of false positives. On the other hand, if the program employs an antidisassembly technique that is able to deceive the disassembler into decoding false instructions, the resulting opcodes of the false instructions will have different statistical distribution than those of real ones. If the entropy of only referenced instructions is computed, we would have a more specific and accurate use of the entropy metric. Thus, even if a normal program contains data of high entropy within the code, the entropy of this data will not be incorporated in the total entropy calculation, because the flow of execution of a normal program ensures jumping over this data during execution. FIG. 7 shows the distribution of file entropy when only referenced instructions are considered, for both non-obfuscated clean and obfuscated malicious files, respectively.

Existence of interleaving instructions. In our system we flag any file with interleaving instructions as obfuscated, since unobfuscated applications do not usually intentionally employ opaque predicate. Existence of such interleaving instructions is a clear flag of obfuscation, unless it is a bug or an artifact in an unobfuscated program. Shown shortly herein is how the system found an artifact in non-obfuscated Windows files when interleaving instructions were detected in them.

Existence of unknown opcodes. If an unknown opcode is encountered while disassembling the file, it means that the disassembly process is diverted from the normal execution path, and the file is flagged as obfuscated. It's worth mentioning that our disassembler does not make assumptions about indirect addressing. Assumption in this case would be uncertain and following uncertain paths would definitely lead to high false-positive rate. Therefore, since the disassembler covers almost all opcodes of the x86 and IA-64 architecture, even some of undocumented instructions, finding an unknown opcode in the extracted instructions would be a strong evidence of obfuscation.

Experiment and Evaluation of the Detection Method

Examples of the system executed on two sets of files. The first set consists of 250 clean files taken from a clean Windows XP 32-bit machine, all of them non-packed. The second set consists of 250 malicious packed files, packed by both commercial and custom packers. The ranges of values for the features introduced in herein are shown in Tables I and II for both clean and malicious sets, respectively. Based on the result in Table I, we established six criteria to test if the file is packed:

1) The sink vertices ratio lies outside the range of non-packed files.
2) The referenced instructions ratio lies outside the range of non-packed files.
3) Average number of instructions in basic block lies outside the range of non-packed files.
4) Entropy of referenced instructions lies outside the range of non-packed files.
5) The code has one or more anti-disassembly tricks.
6) The code references an unknown opcode.

TABLE I

VALUE RANGES OF STATISTICAL FEATURES IN WINDOWS XP CLEAN FILE SET.

| Property | Min | Max |
| --- | --- | --- |
| Sink vertices ratio | 0.0260047 | 0.254545 |
| Referenced instructions ratio | 0.000544839 | 0.884181 |

TABLE I-continued

VALUE RANGES OF STATISTICAL FEATURES IN WINDOWS XP CLEAN FILE SET.

| Property | Min | Max |
|---|---|---|
| Average number of instructions in basic block | 2.3125 | 19.6357 |
| Entropy of referenced instructions | 3.38 | 5.61 |
| Files with a referenced unknown opcode | | 0 |
| Files with anti-disassembly trick | | 0 |

TABLE II

VALUE RANGES OF STATISTICAL FEATURES IN MALICIOUS FILE SET.

| Property | Min | Max |
|---|---|---|
| Sink vertices ratio | 0.0 | 1.0 |
| Referenced instructions ratio | $1.89169 \times 10^{-6}$ | 0.92139 |
| Average number of instructions in basic block | 1 | 2142 |
| Entropy of referenced instructions | 0 | 6.81 |
| Number of referenced unknown opcode | 0 | 5 |
| Files with anti-disassembly trick | | 63 |

Based on these criteria, we achieved 100% correct detection of the clean files as non-packed and 98.8% of the malicious files as packed or obfuscated. This result is shown in Table III. In addition, by adding an extra criterion by measuring the entropy of the entry point section and marking files with entropy greater than 6.5 as packed, the system could achieve 100% detection of malicious files as packed, i.e., 0% false negatives. However, this introduced a 14.8% false positive rate as some of the clean non-obfuscated files were flagged as obfuscated.

In certain embodiments of the invention, checks on the file structure which further improve the result. The following list of structural features are used by the system and methods to help identify obfuscated files:

1) The entry point is in file header before any section.
2) There is no .text or CODE section in the file.
3) The entry point is in the last section while it is neither .text nor CODE section.
4) SizeOfRawData=0 and VirtualSize>0 for some sections.
5) Sum of SizeOfRawData field of all sections is greater than the file size.
6) Two or more sections overlap.
7) The file has no imports at all or the import table is corrupted.

The scanning result when using each detection features is shown in Table III where FN and FP refer to false negative and false positive rates, respectively.

423 clean non-obfuscated files from a clean Windows 7 32-bit Home Basic Edition were collected and scanned using only the system's instructions-based criteria. Used are the ranges mentioned in Table I as detection conditions. There were 7 out of the 423 files (1.64%) detected as obfuscated. Since we know that those files are not obfuscated, we considered, at the beginning, the result as a false-positive. However, after manually reverse engineering the files, it turned out there is an artifact of some incomplete code generation [13] in six of them. The files have overlapped instructions that, if executed, would likely crash the programs under certain conditions. Although these conditions were not clear to us, based on the instructions' location in the file, we feel that is unlikely that the execution of these faulty instructions would ever take place [13]. The seventh file is sppsvc.exe that has Referenced Instruction Ratio=0: 000273778, which is less than the minimum boundary set in Table I. Therefore, since the first six files contain an artifact, one could safely exclude them from the set and consider that there was no false-positive in the results except that corresponding to sppsvc.exe. Finally, when using entropy for detection, it led to the worst result as some non-obfuscated files show high entropy in the code section. The full results of this analysis of the file sets are shown in Table III.

TABLE III

FILE SET ANALYSIS RESULTS.

| | FN | FP | Correctly detected | Percentage % |
|---|---|---|---|---|
| Instructions-based features only | | | | |
| Clean files, WinXP | 0% | 0% | 250/250 | 100% |
| Clean files, Win7 | 0% | 0.1% | 416/417 | 99.9% |
| Malicious files | 1.2% | 0% | 247/250 | 98.8% |
| Instructions-based features with checking entropy of entry point section | | | | |
| Clean files, WinXP | 0% | 14.8% | 213/250 | 85.2% |
| Clean files, Win7 | 0% | 13.2% | 362/417 | 86.8% |
| Malicious files | 0% | 0% | 250/250 | 100% |
| Structural features only | | | | |
| Clean files, WinXP | 0% | 0% | 250/250 | 100% |
| Clean files, Win7 | 0% | 0% | 417/417 | 100% |
| Malicious files | 36.8% | 0% | 158/250 | 63.2% |
| Instructions-based with structural features | | | | |
| Clean files, WinXP | 0% | 0% | 250/250 | 100% |
| Clean files, Win7 | 0% | 0.1% | 416/417 | 99.9% |
| Malicious files | 0% | 0% | 250/250 | 100% |

Another test set was run on a larger set of 10,171 malicious files. The set is a collection of live malware provided by a security firm. Unfortunately, no details about the set in terms of packing/obfuscation were provided. Although scanning results of this set is not a concrete measure of the effectiveness of the system since a confirmed value of false-positive or false-negative can be provided, the results are shown for the sake of illustration and enablement. Table IV shows the value ranges of each criteria, while Table V shows the result of scanning the large malware set. For all of the examples, the system was able to process files at an average rate of 12 ms each.

TABLE IV

VALUE RANGES OF STATISTICAL FEATURES IN LARGE SET OF MALICIOUS FILES.

| Property | Min | Max |
|---|---|---|
| Sink vertices ratio | 0.0 | 1.0 |
| Referenced instructions ratio | $0.62 \times 10^{-6}$ | 1.0 |
| Average number of instructions in basic block | 1 | 69600 |
| Entropy of referenced instructions | 0 | 7.23 |
| Number of referenced unknown opcode | 0 | 163 |
| Files with anti-disassembly trick | | 1835 |

TABLE V

ANALYSIS RESULTS FROM THE LARGE SET OF MALWARE.

|  | Detected as packed | Percentage % |
|---|---|---|
| Instructions-based features only | 9982/10171 | 98.1418% |
| Instructions-based with structural features | 10161/10171 | 99.9% |

Several physical configurations may be implemented such as in a centralized server or a disparate server configuration. In an embodiment, the minimum physical configuration is at least one processor and a storage medium that stores computer program logic that is executable by the one or more processors for performing the steps or functionality discussed herein for the detection obfuscation and packing in computer files and systems. That is the server(s) is/are configured for performing the steps or functionality discussed herein for the detection obfuscation and packing in computer files and systems.

In brief, the invention is directed to a system and method of use for the detection obfuscation and packing in computer files and systems.

The disclosed device and method of use is generally described, with examples incorporated as particular embodiments of the invention and to demonstrate the practice and advantages thereof. It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention. Terms such as "a", "an", and "the" are not intended to refer to only a singular entity, but include the general class of which a specific example may be used for illustration. The terminology herein is used to describe specific embodiments of the invention, but their usage does not delimit the disclosed systems or methods of use, except as may be outlined in the claims.

Any embodiments comprising a one piece or multi piece system having the structures as herein disclosed with similar function shall fall into the coverage of claims of the present invention and shall lack the novelty and inventive step criteria.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific system and method of use described herein. Such equivalents are considered to be within the scope of this invention and are covered by the claims.

All publications, references, patents, and patent applications mentioned in the specification are indicative of the level of those skilled in the art to which this invention pertains. All publications, references, patents, and patent applications are herein incorporated by reference to the same extent as if each individual publication, reference, patent, or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

The system and/or methods of use disclosed and claimed herein can be made and executed without undue experimentation in light of the present disclosure. While the system and methods of use of this invention have been described in terms of preferred embodiments, it will be apparent to those skilled in the art that variations may be applied to the system and/or methods of use and in the steps or in the sequence of steps of the method of use described herein without departing from the concept, spirit, and scope of the invention.

More specifically, it will be apparent that certain components, which are both shape and material related, may be substituted for the components described herein while the same or similar results would be achieved. All such similar substitutes and modifications apparent to those skilled in the art are deemed to be within the spirit, scope, and concept of the invention as defined by the appended claims.

REFERENCES

1. R. Lyda and J. Hamrock, "Using entropy analysis to find encrypted and packed malware," Security Privacy, IEEE, vol. 5, no. 2, pp. 40-45, 2007.
2. A. Stepan, "Improving proactive detection of packed malware," Virus Bulletin, pp. 11-13, March 2006.
3. VirusTotal.com, "ahui.exe." http://goo.gl/kbbJKi. Accessed: Feb. 7, 2014.
4. VirusTotal.com, "edfrgntfs.exe." http://goo.gl/XCqUcF. Ac-cessed: Feb. 7, 2014.
5. X. Ugarte-Pedrero, I. Santos, B. Sanz, C. Laorden, and P. Bringas, "Countering entropy measure attacks on packed software detection," in Consumer Communications and Networking Conference (CCNC), 2012 IEEE, pp. 164-168, 2012.
6. aldeid.com, "PEiD." http://www.aldeid.com/wiki/PEiD. Accessed: Feb. 8, 2014.
7. M. Shafiq, S. Tabish, and M. Farooq, "PE-probe: leveraging packer detection and structural information to detect malicious portable exe-cutables," in Proceedings of the Virus Bulletin Conference (VB), pp. 29-33, 2009.
8. R. Perdisci, A. Lanzi, and W. Lee, "Classification of packed executables for accurate computer virus detection," Pattern Recogn. Lett., vol. 29, pp. 1941-1946, October 2008.
9. S. Treadwell and M. Zhou, "A heuristic approach for detection of obfuscated malware," in Intelligence and Security Informatics, 2009. ISI '09. IEEE International Conference on, pp. 291-299, June 2009.
10. I. Santos, X. Ugarte-Pedrero, B. Sanz, C. Laorden, and P. G. Bringas, "Collective classification for packed executable identification," in Pro-ceedings of the 8th Annual Collaboration, Electronic Messaging, Anti-Abuse and Spam Conference, CEAS '11, (New York, N.Y., USA), pp. 23-30, ACM, 2011.
11. G. Myles and C. Collberg, "Software watermarking via opaque pred-icates: Implementation, analysis, and attacks," Electronic Commerce Research, vol. 6, no. 2, pp. 155-171, 2006.
12. E. Eilam, Reversing: Secrets of Reverse Engineering. Wiley & Sons, 2008.
13. P. Ferrie, "Principal anti-virus researcher at Microsoft." Personal Com-munication. Jan. 22, 2014.
[14] BeaEngine, "BeaEngine." http://www.beaengine.org/. Accessed: Apr. 3, 2014.

What is claimed is:

1. A system for instructions-based detection of sophisticated obfuscation comprising:
   one or more hardware processors;
   and a storage medium that stores computer program logic that is executable by the one or more hardware processors, said computer program logic comprising:
   criteria to test if a file is packed; and
   wherein said criteria is further comprised of checking if the sink vertices ratio lies outside the range of non-packed files.

2. A system for instructions-based detection of sophisticated obfuscation comprising:
   one or more hardware processors;
   and a storage medium that stores computer program logic that is executable by the one or more hardware processors, said computer program logic comprising:
   criteria to test if a file is packed; and
   wherein said criteria is further comprised of
   checking if the sink vertices ratio lies outside the range of nonpacked files;
   checking if the referenced instructions ratio lies outside the range of non-packed files;
   checking if the average number of instructions in basic block lies outside the range of non-packed files;
   checking if the entropy of referenced instructions lies outside the range on non-packed files;
   checking if the code has one or more anti-disassembly tricks; and
   checking if the code references an unknown opcode.

3. A system for instructions-based detection of sophisticated packing comprising:
   one or more hardware processors;
   and a storage medium that stores computer program logic that is executable by the one or more hardware processors, said computer program logic comprising:
   criteria to identify obfuscated files; and
   wherein said criteria is further comprised of checking if SizeOfRawData=0 and VirtualSize>0 for some section.

4. A system for instructions-based detection of sophisticated packing comprising:
   one or more hardware processors;
   and a storage medium that stores computer program logic that is executable by the one or more hardware processors, said computer program logic comprising:
   criteria to identify obfuscated files; and
   wherein said criteria is further comprised of checking if the sum of SizeOfRawData field of all sections is greater than the file size.

5. A system for instructions-based detection of sophisticated packing comprising:
   one or more hardware processors;
   and a storage medium that stores computer program logic that is executable by the one or more hardware processors, said computer program logic comprising:
   criteria to identify obfuscated files; and
   wherein said criteria is further comprised of checking if the file has no imports at all or the import table is corrupted.

6. A system for instructions-based detection of sophisticated packing comprising:
   one or more hardware processors;
   and a storage medium that stores computer program logic that is executable by the one or more hardware processors, said computer program logic comprising:
   criteria to identify obfuscated files; and
   wherein said criteria is further comprised of
   checking if the entry point is in file header before any section;
   checking if there is no .text or CODE section in the file;
   checking if the entry point is in the last section while it is neither .text nor CODE section;
   checking if SizeOfRawData=0 and VirtualSize>0 for some section;
   checking the sum of SizeOfRawData field of all sections is greater than the file size;
   checking if two or more sections overlap; and
   checking if the file has no imports at all or the import table is corrupted.

7. A system for instructions-based detection of sophisticated obfuscation and packing comprising:
   one or more hardware processors;
   and a storage medium that stores computer program logic that is executable by the one or more hardware processors, said computer program logic comprising:
   criteria to test if a file is packed and identify obfuscated files;
   wherein said criteria is comprised of
   checking if the sink vertices ratio lies outside the range of nonpacked files;
   checking if the referenced instructions ratio lies outside the range of non-packed files;
   checking if the average number of instructions in basic block lies outside the range of non-packed files;
   checking if the entropy of referenced instructions lies outside the range on non-packed files;
   checking if the code has one or more anti-disassembly tricks;
   checking if the code references an unknown opcode;
   checking if the entry point is in file header before any section;
   checking if there is no .text or CODE section in the file;
   checking if the entry point is in the last section while it is neither .text nor CODE section;
   checking if SizeOfRawData=0 and VirtualSize>0 for some section;
   checking the sum of SizeOfRawData field of all sections is greater than the file size;
   checking if two or more sections overlap; and
   checking if the file has no imports at all or the import table is corrupted.

* * * * *